US008718716B2

(12) United States Patent
Kader

(10) Patent No.: US 8,718,716 B2
(45) Date of Patent: May 6, 2014

(54) METHOD OF DISPLAYING IMAGES WHILE CHARGING A SMARTPHONE

(76) Inventor: Steven Earl Kader, Chicago, IL (US)

(*) Notice: Subject to any disclaimer, the term of this patent is extended or adjusted under 35 U.S.C. 154(b) by 237 days.

(21) Appl. No.: 13/478,259

(22) Filed: May 23, 2012

(65) Prior Publication Data
US 2013/0316763 A1 Nov. 28, 2013

(51) Int. Cl.
H04M 1/00 (2006.01)
(52) U.S. Cl.
USPC ........... 455/566; 455/572; 455/574; 455/573; 715/730; 345/619; 345/629; 345/649
(58) Field of Classification Search
USPC .............. 455/556.1, 557, 566, 572, 573, 574; 345/619, 620, 625, 629, 649, 654, 659; 715/273, 867, 730–732
See application file for complete search history.

(56) References Cited

U.S. PATENT DOCUMENTS

| | | | |
|---|---|---|---|
| 6,052,509 A * | 4/2000 | Abe | 386/230 |
| 2001/0043786 A1 * | 11/2001 | Takahashi et al. | 386/46 |
| 2004/0041845 A1 * | 3/2004 | Alben et al. | 345/846 |
| 2008/0018666 A1 * | 1/2008 | Takeuchi | 345/629 |
| 2008/0074499 A1 * | 3/2008 | Niimura | 348/207.1 |
| 2008/0077863 A1 * | 3/2008 | Jong et al. | 715/277 |
| 2008/0129835 A1 * | 6/2008 | Chambers et al. | 348/231.2 |
| 2008/0174570 A1 * | 7/2008 | Jobs et al. | 345/173 |
| 2008/0201637 A1 * | 8/2008 | Shirasaki | 715/705 |
| 2008/0320395 A1 * | 12/2008 | Yuasa | 715/735 |
| 2009/0003799 A1 * | 1/2009 | Inoha et al. | 386/95 |
| 2009/0033785 A1 * | 2/2009 | Fujinawa et al. | 348/333.01 |
| 2009/0058842 A1 * | 3/2009 | Bull et al. | 345/212 |
| 2009/0141245 A1 * | 6/2009 | Nozaki et al. | 353/56 |
| 2009/0156270 A1 * | 6/2009 | Thompson et al. | 455/574 |
| 2009/0263704 A1 * | 10/2009 | Batra | 429/61 |
| 2010/0149342 A1 * | 6/2010 | Sugino | 348/169 |
| 2010/0164836 A1 * | 7/2010 | Liberatore | 345/1.1 |
| 2010/0223824 A1 * | 9/2010 | Mandelbaum et al. | 40/463 |
| 2011/0010667 A1 * | 1/2011 | Sakai et al. | 715/810 |
| 2011/0133687 A1 * | 6/2011 | Kim et al. | 320/101 |
| 2012/0108293 A1 * | 5/2012 | Law et al. | 455/557 |
| 2012/0162480 A1 * | 6/2012 | Hitosuga | 348/239 |
| 2012/0256929 A1 * | 10/2012 | Koenig et al. | 345/503 |
| 2012/0265491 A1 * | 10/2012 | Drummy | 702/189 |
| 2012/0288288 A1 * | 11/2012 | Imaizumi | 399/38 |

* cited by examiner

Primary Examiner — Lester Kincaid
Assistant Examiner — Mehmood B Khan
(74) Attorney, Agent, or Firm — Stephen E. Zweig

(57) ABSTRACT

A method for displaying at least one image from a set of images while a computerized device such as a Smartphone is charging. The method, which will often be a software implemented method such as a downloadable Smartphone "app" will generally comprise using the Smartphone's graphical user interface to select a set of images to display while said Smartphone is charging, and also using the Smartphone's graphical user interface to determine a set of parameters to use to control the display of these images while the Smartphone is charging. The invention's software will additionally determine the charging status of the Smartphone. In operation, while the Smartphone is charging, the software will then display these images, often according to the previously entered set of parameters used to control the display of these images.

8 Claims, 5 Drawing Sheets

METHOD OF DISPLAYING IMAGES WHILE CHARGING A SMARTPHONE

BACKGROUND OF THE INVENTION

1. Field of the Invention

This invention is in the field of battery charging methods for Smartphones, as well as and other battery operated computerized devices with graphical display screens.

2. Description of the Related Art

Battery operated computerized devices with high resolution display screens, such as Smartphones, are nearly ubiquitous in the modern world.

Often, such devices, here exemplified by the popular BlackBerry® series of Smartphones, utilize comparatively large amounts of power. These devices often have rechargeable batteries, such as lithium-ion batteries, as well as power jacks that allow the device's battery to be recharged by outside power sources. Such power jacks allow the computerized device to be recharged by an AC adapter or USB (Universal Serial Bus) cable to an external power source.

When these computerized devices are plugged into an external recharging power source, invariably the device will display a recharging screen that may, for example, show a still or moving icon, image, or cartoon of a battery, along with some indication that the battery is recharging. Often, the user may also continue to use the computerized device for other functions while the device is charging.

Otherwise, the charging phase of operation of a typical battery powered computerized device such as a Smartphone is relatively unused at present.

BRIEF SUMMARY OF THE INVENTION

The invention is based, in part, on the insight that the utility of such battery operated computerized Smartphone devices, during the charging phase, can be enhanced by providing a novel type of application software or "app" that would in effect turn the computerized device into a user customized photo album during recharging.

In one embodiment, the invention may be a method for displaying at least one image from a set of images while a computerized device such as a Smartphone is charging. Generally this computerized device will be a Smartphone, and this Smartphone will often comprise a cellular phone transceiver (and occasionally also a WiFi transceiver), at least one processor (e.g. microprocessor), software, memory, real-time clock, a graphical user interface, bitmapped display screen, battery, and a battery charging interface.

The method, which will often be implemented by software in the form of a downloadable Smartphone "app", will generally comprise using the Smartphone's graphical user interface to select a set of images to display while the Smartphone is charging. The user of the device may also use the Smartphone's graphical user interface to determine a set of parameters to use to control the display of these images while the Smartphone is charging. The invention's software will additionally determine the charging status of the Smartphone. In operation, when the software detects that the Smartphone is charging, and while the Smartphone is charging, the software will then display these user selected images, often according to the user entered set of parameters used to control the display of these images.

One embodiment of the invention's method, a Blackberry® application entitled "Charged with Pictures" was developed and was released on the Blackberry application store by applicant on Nov. 14, 2001. In this disclosure, the invention's method(s) will occasionally be referred to as "Charged with Pictures" in reference to this particular embodiment.

DETAILED DESCRIPTION OF THE INVENTION

Figure 1:
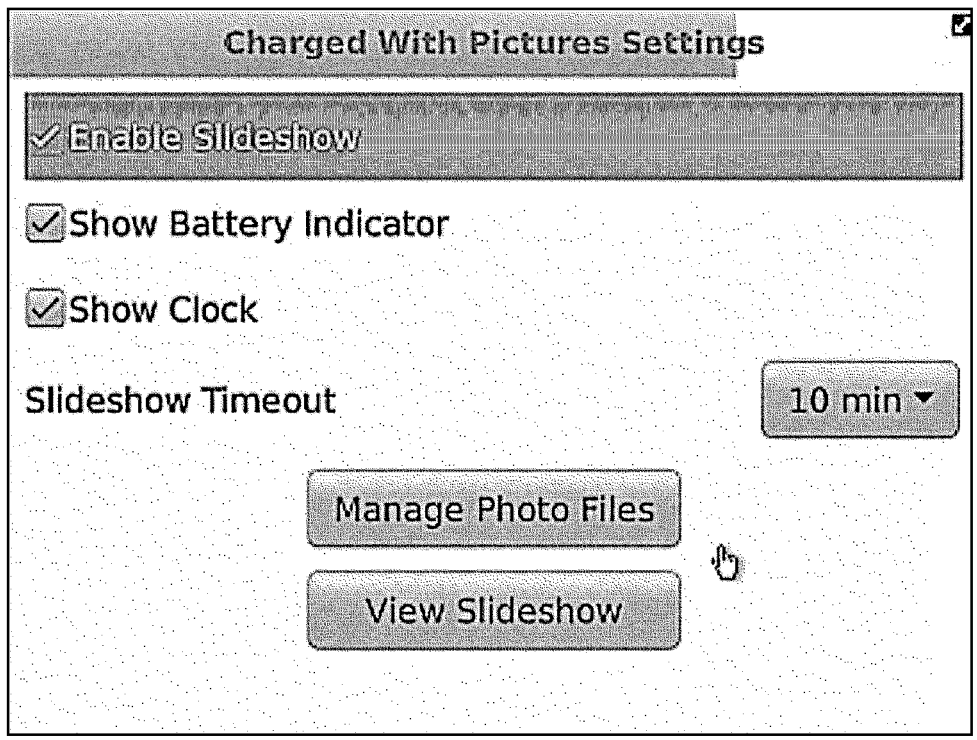
FIG. 1 shows an example of the software's configuration.

As previously discussed, in one embodiment, the invention may be a method for displaying at least one image from a set of images while a computerized device such as a Smartphone is charging. Generally this Smartphone will often comprise a cellular phone transceiver, at least one processor (e.g. microprocessor), software, memory, real-time clock, a graphical user interface, bitmapped display screen, battery, and a battery charging interface.

The method, which will often be implemented by software such as a downloadable Smartphone "app", will generally allow a user to use the Smartphone's graphical user interface to select a set of images to display while the Smartphone is charging. The user may also use the Smartphone's graphical user interface to determine a set of parameters to use to control the display of these images while the Smartphone is charging.

In operation, the invention's software will additionally determine the charging status of the Smartphone. When the software detects that the Smartphone is charging, the software will then display these user selected images, often according to the user's previously entered set of parameters used to control the display of these images.

Often, the invention's software will determine the charging status of the Smartphone or other computerized device by interrogating either the charging status of the device's battery, the presence of power on the device's battery charging interface, or both methods.

The "Charged with Pictures" embodiment of the invention, published by the applicant on the Blackberry application store on Nov. 14, 2001, described the invention as follows:

"You charge up, usually every day, and if you're using all of BlackBerry's® features all of the time chances are you get charged up while working at the computer, waiting for your flight home, or thinking about the next big project.

Charged with Pictures, JaredCo's latest addition to your app inventory, cycles through your stored pics while charging up, turning your BlackBerry® into an electronic photo albumn.

Please make sure you do not have your BlackBerry® plugged into your computer as a USB device when setting up or running Charged with Pictures.

Place it by your computer and cycle through those vacation pics as you browse the web.

Use it to display elements of that major project to get those creative juices flowing.

Cycle through your album of family pictures as you charge your BlackBerrry® and your batteries during a long day at the desk.

Create albums of your favorite special events, seminars, business presentations and other company matters. Then cycle through each album as you juice your BlackBerry®.

Place it by your bed with a photo cycle of restful, relaxing pictures to gently let you get some much-needed sleep.

You'll use Charged with Pictures every time you pump up the power, but if you want to see the traditional BlackBerry® charger screen, simply turn off charged with pictures with a tap.

Use it when you want to or need to and get re-charged along with your BlackBerry®.

Charged with pictures is super easy to sync up with your album and display settings. Click. Tap. You're good to go.

Additionally, the instructions for use for this Blackberry app embodiment state:

Charged With Pictures cycles through your stored pics while you charge your BlackBerry, turning your BlackBerry into an electronic photo album.

1. Click the Charged With Pictures icon to open the app and to access the set up screen;

2. Click the "Manage Photo Files" then click the "Add File" button to select the photos you want in your slide show;

3. Highlight any of your photos in the list and click your BlackBerry Menu button and select "Add Photo To Album". Repeat this process to select all the photos you want in your slide show;

4. Press the Back/Escape key on your BlackBerry to return to the set up screen and then to exit the app;

5. To remove any photo from your slide show, click on the "Manage Photo Files" then click on the photo you want to delete.

6. The next time you in plug your BlackBerry for charging, Charged With Pictures will automatically launch and display your slide show;

7. Press the Back/Escape key on your BlackBerry at any time to exit the slide show.

In some embodiments, the set of parameters to control the display of the images while the Smartphone or other computerized device is charging may include a clock option to overlay a graphic image of a clock with the current time while charging. Thus while the Smartphone is charging, it can display the images with an overlay of the graphic image of the clock.

Alternatively or additionally, the set of parameters to control the display of said set of images while the Smartphone is charging can further include a battery option to overlay a graphic image of a battery with the Smartphone's current battery charge status.

FIG. 1 shows an example of the software's configuration screen. Here the user can set the software to show a slideshow during charging, and optionally also show a battery indicator icon and clock icon during charging.

In some embodiments, the set of user set parameters can also include one or more parameters to adjust the length of time during which the user selected images are displayed while the Smartphone is charging.

Figure 2:
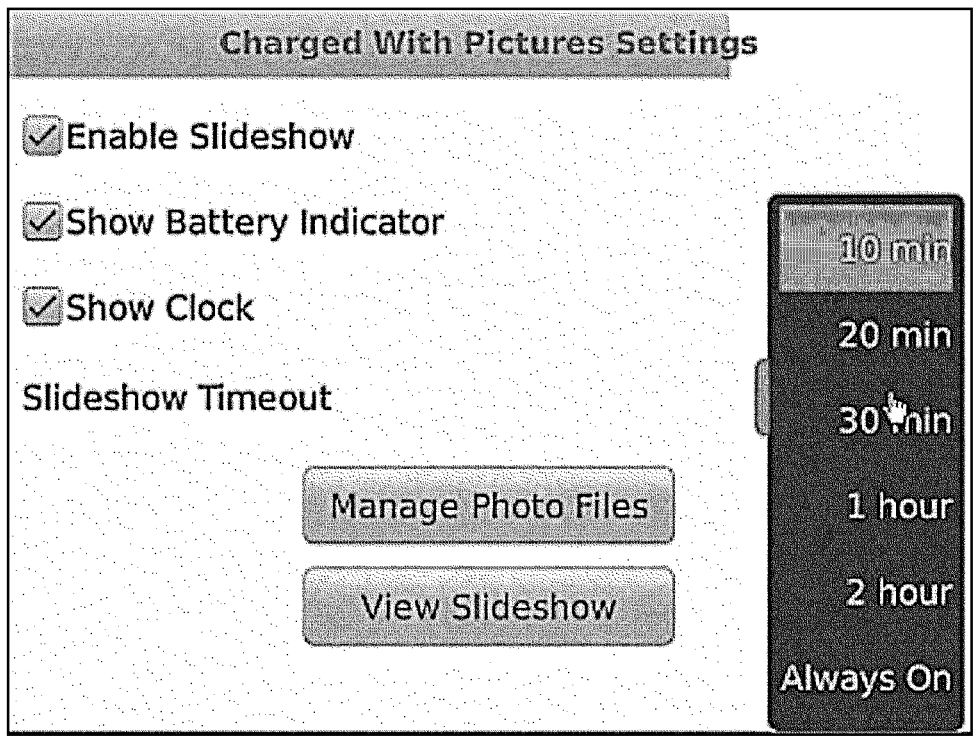
FIG. 2 shows an example of the software's configuration screen.

FIG. 2 shows another example of the software's configuration screen. Here the user can also set the software to show the slideshow for varying amounts of time after the device is plugged into the charger.

Alternatively, the user determined set of image display during charging parameters can also include parameters to determine how long each image is displayed, or the time of day in which the set of images will be displayed while the Smartphone is charging.

This later feature is particularly helpful for coping with different demands between work and personal use. Here, for example, when a Smartphone is used for both work and personal use, some of the personal images displayed while charging (e.g. see the images of cute dogs or cats), although desirable and soothing to the user to view while the device is charging at night at home, may be considered unprofessional if the Smartphone needed to be charged at work during the work day.

To prevent this sort of personal/business use problem, in some embodiments, the software may allow the user to select at least one part of the day (such as the evening) to be designated as a time to display the selected images while the Smartphone is charging. However during a different part of the day (such as daytime working hours), the user may select this different part of the day as a time not to display the charging images during Smartphone charging.

Figure 3:
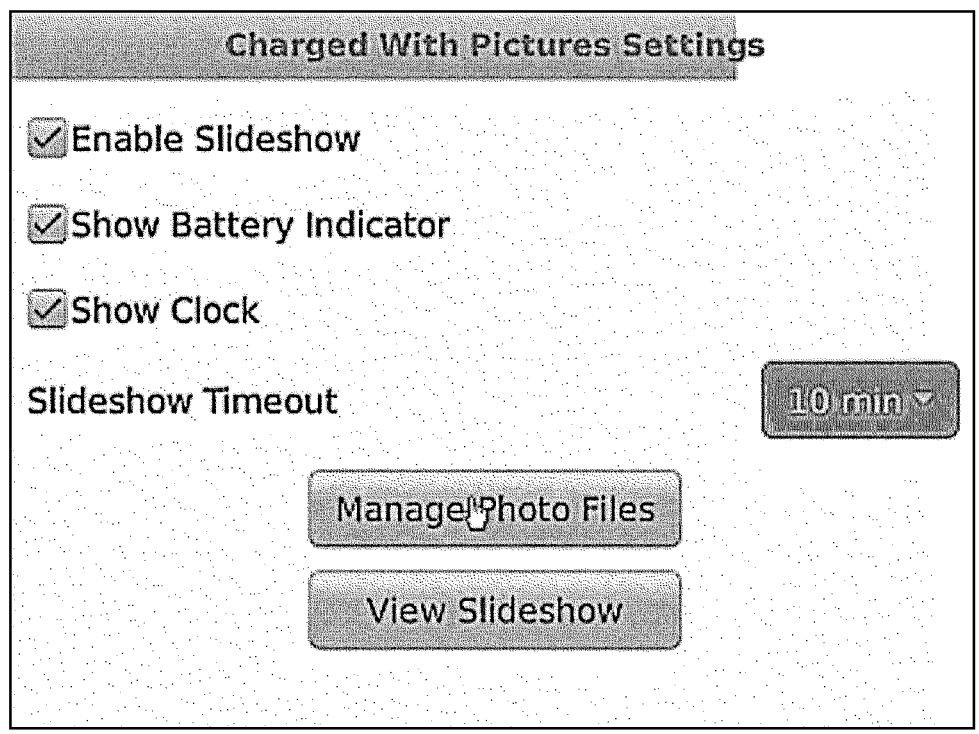
FIG. 3 shows an example of the software's configuration screen where the user can determine which photo files (images, pictures) the device should show during charging.

FIG. 3 shows another example of the software's configuration screen. Here where the user can also determine which photo files (images, pictures) the device should show during charging.

Figure 4:
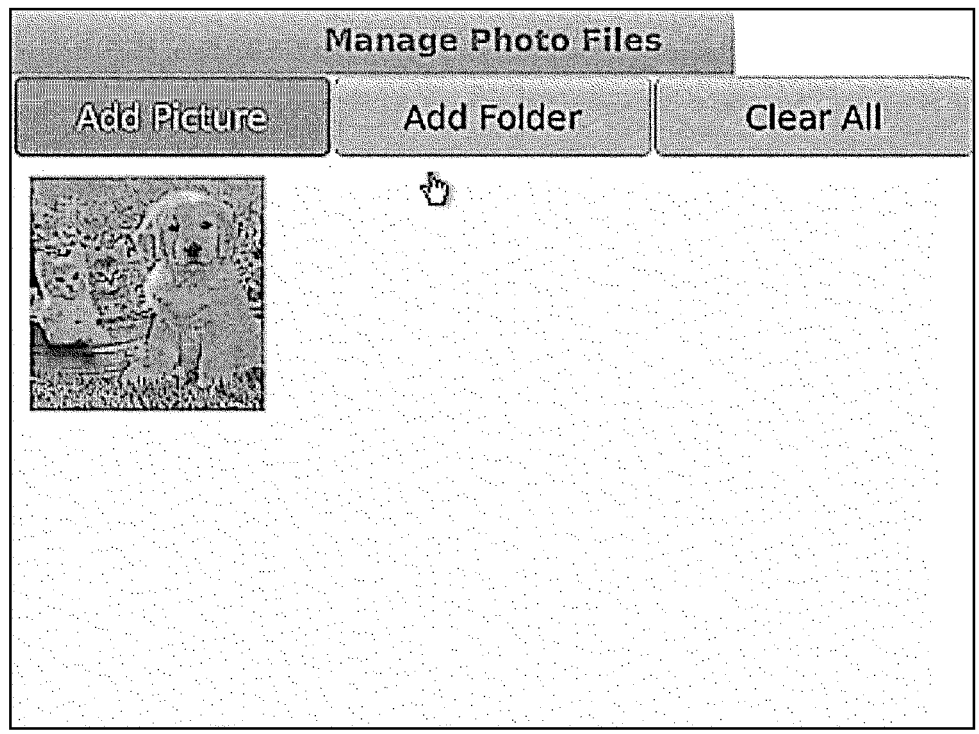
FIG. 4 shows an example of the software's photo file manager.

FIG. 4 shows an example of the software's photo file manager. Here one picture has already been designated by the user for showing during charging. The user can add additional pictures on a one at a time basis, add an entire folder of pictures for showing during charging, or select individual pictures from a different picture folder.

Figure 5:
FIG. 5 shows the user selecting a folder of images.

FIG. 5 shows the user selecting a folder of images, entitled "Picture Library", for showing during the charging process.

Figure 6:
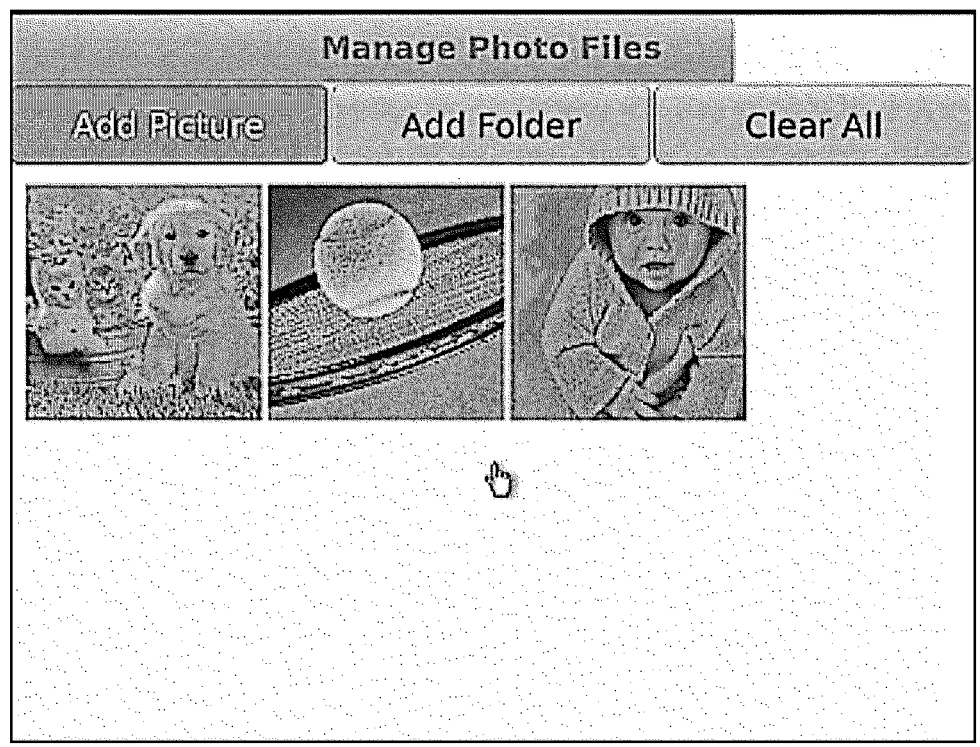
FIG. 6 shows the user selecting individual pictures.

FIG. 6 shows the user selecting individual pictures for showing during the charging process.

The Smartphone's bitmapped display screen will generally have a horizontal number of display screen pixels, and a vertical number of display screen pixels. Often, however, the Smartphones horizontal and vertical pixel dimensions and orientation will not match those of the images the user wishes to display on charging.

To ensure that the pictures (e.g. images) are displayed in the correct orientation, the invention's software may make use of the fact that often such image files will have metadata that provides the rotation status of the image. That is, the metadata will indicate the position of the camera while the image was photographed. The invention's software can read this metadata, and orient the image to be displayed on charging appropriately.

Often as well, the various images will generally also have their own pixel parameters, such as the image's horizontal number of image pixels and a vertical number of image pixels, which will not match those of the Smartphone's display screen. When this happens, the image orientation or pixel parameters of any given image may not be ideal for charging slide show purposes—that is the uncorrected image would be displayed rotated the wrong way, or with aesthetically displeasing sizes or cut-off portions, relative to the Smartphone's screen.

To correct this problem, the invention's software may either automatically, or with user entered parameters, intelligently manipulate the images as well. Thus for example, when the software's and Smartphone's graphical user interface is used to select an image (here called a "selected image"), the software may also read the metadata associated with the selected image, and rotate the selected image according to the metadata rotation status of this image, thus producing a rotated selected image.

The invention's software may also automatically resize this rotated selected image so that either the horizontal number of image pixels matches the horizontal number of display screen pixels, and/or the vertical number of image pixels matches the vertical number of display screen pixels, thus producing a resized rotated selected image.

The software may then store this resized rotated selected image in the Smartphone's memory, and then automatically use these or more resized rotated selected image to display while the Smartphone is charging. Generally such images are shown many times, and by doing the rotation and resizing in advance, and storing the results, the Smartphone can reduce the demand on its processor and memory resources.

Figure 7:
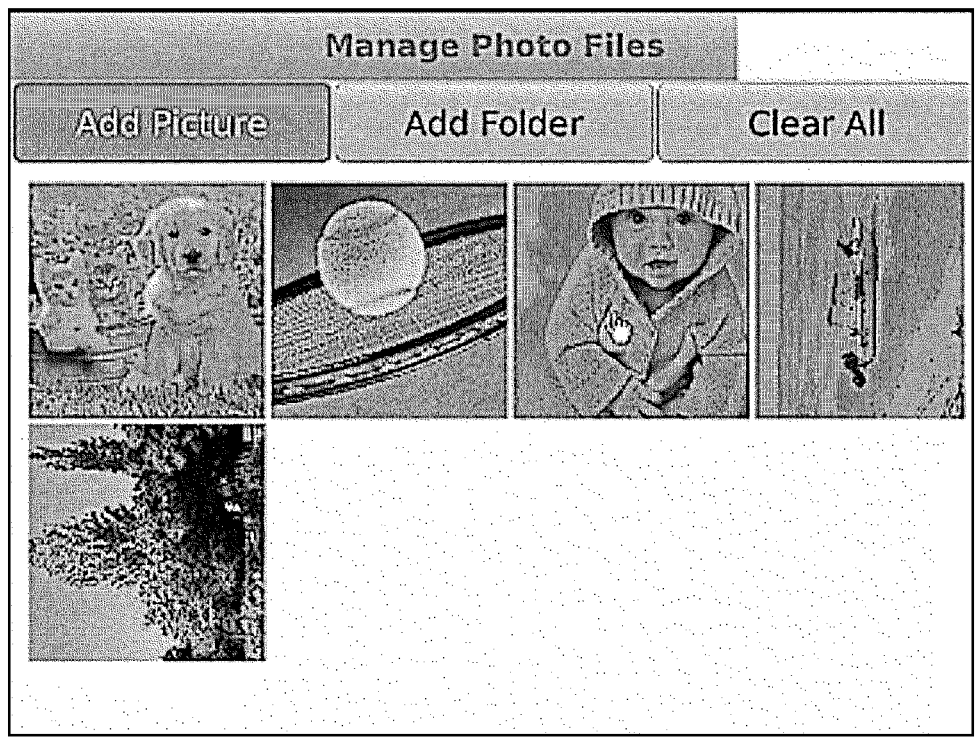
FIG. 7 shows an example of how individual added pictures may need to be rotated.

FIG. 7 shows an example of how individual added pictures may need to be rotated or otherwise adjusted by the user for a better slideshow viewing experience.

Figure 8:
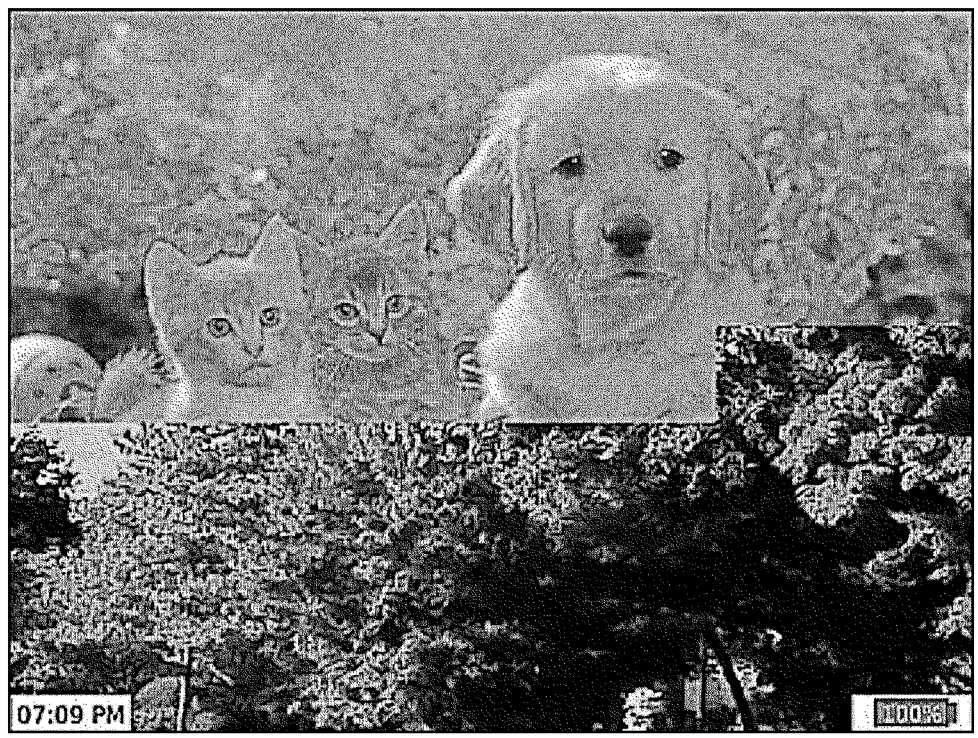
FIG. 8 shows an example of the software charging image display transitioning between a first image and a second image.

FIG. 8 shows an example of the software transitioning between a first image and a second image during the recharging slide show. Note the battery icon in the lower right, and the time in the lower left.

Figure 9:
FIG. 9 shows the software displaying a clock during the charging slide show.

FIG. 9 shows an example of how the software can also show a clock during the slide show.

In other embodiments, the invention's software may also be used for advertising or promotional purposes. For example, the software may direct the Smartphone to use the Smartphone's cellular phone transceiver (or WiFi transceiver) to retrieve advertisements while the Smartphone is charging and the set of images is being displayed. The invention's software may also periodically display such advertisements in-between the user selected images, while the user selected set of images is displayed. Thus the pattern could be one of 10× user images, 1 advertising image, 10× user images, and the like.

In this later embodiment, for example, a free version of the invention's app may be supported by advertising, while a paid version of the invention's app may dispense with the advertising feature.

BlackBerry® is a registered trademark of Research In Motion Limited, Waterloo Canada

The invention claimed is:

1. A method for displaying at least one image from a set of images while a Smartphone is charging, said Smartphone comprising a cellular phone transceiver, processor, software, memory, real-time clock, a graphical user interface, bit-mapped display screen, battery, and a battery charging interface, said method comprising:

selecting on said graphical user interface a set of images to display while said Smartphone is charging;

configuring on said graphical user interface a set of parameters to control the display of said set of images while said Smartphone is charging;

wherein said bitmapped display screen has a horizontal number of display screen pixels and a vertical number of display screen pixels, and wherein at least some of said images further comprise metadata providing the rotation status of said image; and wherein each said image has a horizontal number of image pixels and a vertical number of image pixels;

wherein selecting on said graphical user interface a set of images to display while said Smartphone is charging comprises the steps of:

selecting on said graphical user interface an image, reading said metadata associated with said selected image, and rotating said selected image according to the rotation status of said rotated image producing a rotated selected image;

resizing said rotated selected image so that either said horizontal number of image pixels matches said horizontal number of display screen pixels and/or said vertical number of image pixels matches said vertical number of display screen pixels, producing a resized rotated selected image;

and storing said resized rotated selected image in memory, and applying said resized rotated selected image display while said Smartphone is charging; determining the charging status of said Smartphone;

wherein determining the charging status of said Smartphone comprises interrogating either the charging status of said battery or the presence of power on said battery charging interface;

and while said Smartphone is charging, then displaying said set of images according to said set of parameters to control the display of said set of images;

wherein said set of parameters to control the display of said set of images while said Smartphone is charging comprises parameters to control the time of day in which said set of images will be displayed while said Smartphone is charging; and designating at least one part of the day as a time to display said set of images while said Smartphone is charging, and designating at least one part of the day as a time not to display said set of images while said Smartphone is charging;

wherein said set of parameters to control the display of said set of images while said Smartphone is charging further includes either a clock option to overlay a graphic image of a clock with the current time while charging, or a battery option to overlay a graphic image of a battery with the current battery charge status while charging;

while said Smartphone is charging either displaying said set of images with an overlay of said graphic image of the clock, or displaying said set of images with an overlay of said graphic image of a battery.

2. The method of claim 1, wherein said set of parameters to control the display of said set of images while said Smartphone is charging comprises parameters to adjust the length of time during which said set of images is displayed while said Smartphone is charging.

3. The method of claim 1, wherein said set of parameters to control the display of said set of images while said Smartphone is charging comprises parameters to control the length of time each said image is displayed.

4. The method of claim 1, further employing said cellular phone transceiver to retrieve advertisements while said Smartphone is charging and said set of images is displayed; and periodically displaying said advertisement in between said images while said set of images is displayed.

5. A method for displaying at least one image from a set of images while a Smartphone is charging, said Smartphone comprising a cellular phone transceiver, processor, software, memory, real-time clock, a graphical user interface, bit-mapped display screen, battery, and a battery charging interface, said method comprising:

selecting on said graphical user interface a set of images to display while said Smartphone is charging;

configuring on said graphical user interface a set of parameters to control the display of said set of images while said Smartphone is charging;

wherein said bitmapped display screen has a horizontal number of display screen pixels and a vertical number of display screen pixels, and wherein at least some of said images further comprise metadata providing the rotation status of said image; and wherein each said image has a horizontal number of image pixels and a vertical number of image pixels;

wherein selecting on said graphical user interface a set of images to display while said Smartphone is charging comprises the steps of:

selecting on said graphical user interface an image, reading said metadata associated with said selected image, and rotating said selected image according to the rotation status of said image producing a rotated selected image;

resizing said rotated selected image so that either said horizontal number of image pixels matches said horizontal number of display screen pixels and/or said vertical number of image pixels matches said vertical number of display screen pixels, producing a resized rotated selected image;

and storing said resized rotated selected image in memory, and applying said resized rotated selected image display while said Smartphone is charging;

determining the charging status of said Smartphone;

wherein determining the charging status of said Smartphone is determined by interrogating either the charging status of said battery or the presence of power on said battery charging interface;

and while said Smartphone is charging, then displaying said set of images according to said set of parameters to control the display of said set of images;

wherein said set of parameters to control the display of said set of images while said Smartphone is charging comprises parameters to control the time of day in which said set of images will be displayed while said Smartphone is charging; and designating at least one part of the day as a time to display said set of images while said Smartphone is charging, and designating at least one part of the day as a time not to display said set of images while said Smartphone is charging;

wherein said set of parameters to control the display of said set of images while said Smartphone is charging further includes either a clock option to overlay a graphic image of a clock with the current time while charging, or a battery option to overlay a graphic image of a battery with the current battery charge status while charging;

while said Smartphone is charging either displaying said set of images with an overlay of said graphic image of the clock, or displaying said set of images with an overlay of said graphic image of a battery; and further employing said cellular phone transceiver to retrieve advertisements while said Smartphone is charging and said set of images is displayed; and periodically displaying said advertisements in between said images while said set of images is displayed.

6. The method of claim 5, wherein said at least one part of the day that is designated as a time not to display said set of images while said Smartphone is charging comprises daytime.

7. The method of claim 5, wherein said set of parameters to control the display of said set of images while said Smartphone is charging comprises parameters to adjust the length of time during which said set of images is displayed while said Smartphone is charging.

8. The method of claim 5, wherein said set of parameters to control the display of said set of images while said Smartphone is charging comprises parameters to control the length of time each said image is displayed.

* * * * *